United States Patent [19]
Hayward

[11] Patent Number: 5,256,357
[45] Date of Patent: Oct. 26, 1993

[54] APPARATUS AND METHOD FOR COCASTING FILM LAYERS

[75] Inventor: Jack Hayward, Hilton, N.Y.

[73] Assignee: Eastman Kodak Company, Rochester, N.Y.

[21] Appl. No.: 890,507

[22] Filed: May 28, 1992

[51] Int. Cl.⁵ .............................................. B29C 47/06
[52] U.S. Cl. .................................. 264/171; 118/411; 264/212; 425/131.1; 425/224
[58] Field of Search ................ 264/212, 171; 425/224, 425/131.1; 118/411

[56] References Cited

U.S. PATENT DOCUMENTS

| | | | |
|---|---|---|---|
| 2,679,661 | 6/1954 | Bennes et al. | 264/207 |
| 2,761,417 | 9/1956 | Russell et al. | |
| 2,901,770 | 9/1959 | Beck | 425/131.1 |
| 2,932,855 | 4/1960 | Bartlett et al. | |
| 3,038,209 | 6/1962 | Hunter, Jr. et al. | 264/212 |
| 3,302,239 | 2/1967 | Senecal | 425/131.1 |
| 3,782,947 | 1/1974 | Krall | |
| 4,145,173 | 3/1979 | Pelzer et al. | 425/224 |
| 4,246,335 | 1/1981 | Keogh et al. | 264/216 |
| 4,592,885 | 6/1986 | Ichino et al. | 425/224 |
| 5,072,688 | 12/1991 | Chino et al. | 118/411 |

*Primary Examiner*—Jeffery Thurlow
*Attorney, Agent, or Firm*—Nixon, Hargrave, Devans & Doyle

[57] ABSTRACT

Polymeric films of two or more layers are cocast on a moving substrate from a die having extrusion slots which extend to parallel slot exits spaced close to the substrate. An upstream slot exit has outer and inner lips formed by coplanar lands. The outer upstream land extends to a pinning line formed by the intersection with an outer surface of the die. A downstream slot exit also has lips formed by planar lands and the outer land of the downstream slot exit is spaced a greater distance from the substrate than the other lands. Films with a plurality of uniform layers of different thicknesses are cocast from dopes of different viscosities.

11 Claims, 1 Drawing Sheet

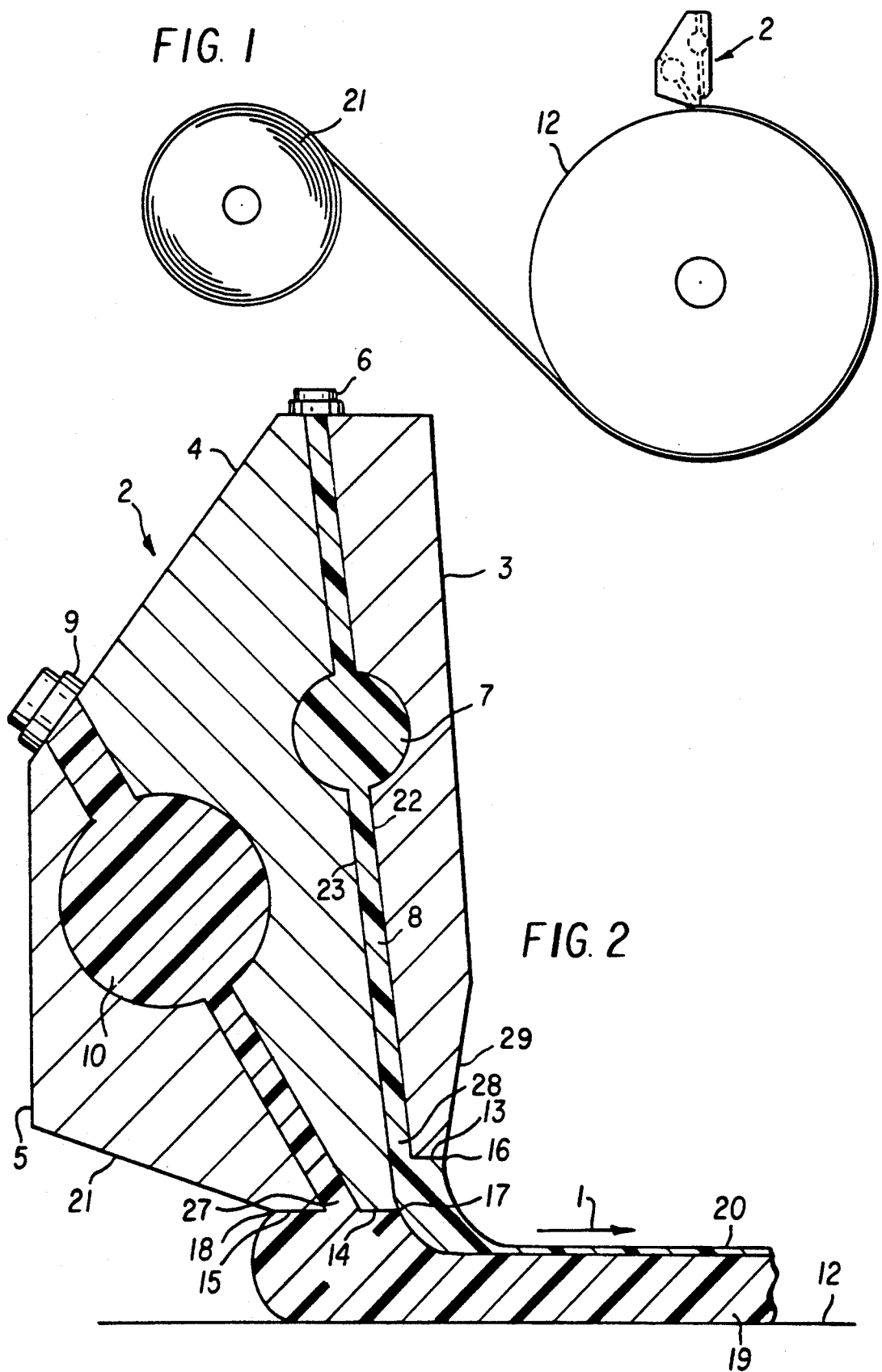

APPARATUS AND METHOD FOR COCASTING FILM LAYERS

FIELD OF THE INVENTION

This invention relates to an apparatus and method for casting polymeric films having two or more layers and, more particularly, to such a method and apparatus for simultaneous casting of the layers.

BACKGROUND

To reduce manufacturing costs it is desirable to cocast plural layer films instead of coating one or more layers on a previously cast film. The prior art discloses apparatus for the simultaneous deposit of two or more layers of solutions or dispersions. For example, the patent to Bartlett et al, U.S. Pat. No. 2,932,855, discloses a multislotted die for simultaneously casting a plurality of layers of polymer compositions on a moving drum. Prior art devices, however, are not satisfactory for casting two or more layers with a high degree of uniformity when the viscosities of the casting solutions or dispersions (also known as dopes in non-aqueous systems) or the thicknesses of the layers differ greatly. Films of this kind include, photographic films that have a magnetic recording layer as disclosed, for example, in the patent to Krall, U.S. Pat. No. 3,782,947. They have a thin magnetic layer and a much thicker cellulosic support layer. Also, they are coated from dopes which differ greatly in viscosity and cannot be cocast precisely with conventional casting dies.

The present invention provides a novel apparatus and method by means of which plural layer films can be cocast with high precision despite great differences in the thicknesses of the layers and the viscosities of the dopes. For example, dope viscosity ratios can be as high as 300,000 to 1 and thickness ratios can range from 5000:1 to 1:1.

BRIEF SUMMARY OF THE INVENTION

The apparatus of the invention comprises a novel cocasting die for the manufacture of polymeric films having two or more layers and includes the combination of the novel die with a casting substrate which is adapted to move continuously in a downstream direction.

The cocasting die is positioned adjacent the substrate for extruding simultaneously two or more casting compositions in continuous layers onto the moving substrate. The die has an upstream side and a downstream side and comprises an assembly of die elements which form a block containing an upstream extrusion slot on the upstream side of the die and a downstream extrusion slot on the downstream side of the die.

The die further comprises a plurality of distribution cavities for receiving casting compositions and feeding same at a constant rate to respective extrusion slots. Each of the slots has narrowly spaced-apart parallel walls extending from a cavity to lips which form an elongated slot exit, the slot exits being mutually parallel.

The die is so positioned that the slot exits are spaced above and close to the substrate, with the long dimensions of the slot exits being perpendicular to the direction of movement of the substrate.

The upstream slot exit has an outer lip comprising a first planar rectangular land which is coextensive in length with the slot exit, said planar rectangular land forming an acute angle with the planar upstream wall of the slot and extending in the widthwise, upstream direction to a pinning line formed by the intersection of the land with an outer surface of the die which intersects the land at an exterior angle greater than 180° and, preferably, greater than 200°. The upstream slot exit has an inner lip formed by a second narrow, elongated land which is coplanar and coextensive in length with the first land.

On the downstream side of the die, a downstream slot exit has a first lip formed by a land that is coplanar with the first planar land and a second lip formed by a downstream planar, rectangular land, said downstream land being coextensive in length with the downstream slot exit and extending in its widthwise direction to a pinning line formed by the intersection with another surface of the die.

The downstream land is spaced from the substrate at a greater distance than the other lands.

The invention also includes a start-up procedure for cocasting on a moving substrate which ensures contact of the casting compositions with pinning lines of the cocasting die. The method comprises feeding first and second liquid casting compositions, each of which comprises a volatile liquid and a polymer, to a first relatively narrow extrusion slot and a second relatively wide extrusion slot, respectively, in said die, the die being so positioned above the moving substrate that the relatively wide extrusion slot is in an upstream direction with respect to the relatively narrow extrusion slot.

Before feeding the casting compositions to said slots, the volatile liquid or a dilute mixture thereof with polymer is fed to said slots. Thereafter the second liquid polymeric composition is substituted for the volatile liquid or dilute mixture and is fed to the second relatively wide slot for sufficient time to establish uniform flow and contact with a pinning line along a land adjacent to said second slot. Thereafter the first liquid casting composition is substituted for the volatile liquid or dilute mixture as the feed for the relatively narrow slot.

BRIEF DESCRIPTION OF THE DRAWINGS

The invention will be further described by reference to the drawings, of which

FIG. 1 is a schematic representation of an apparatus of the invention including a casting substrate and a cocasting die; and FIG. 2 is a schematic sectional view of a cocasting die of the invention.

DETAILED DESCRIPTION OF THE INVENTION

FIGS. 1 and 2 show schematically, and not to scale, an apparatus of the invention comprising a casting substrate 12 and a novel cocasting die 2 which is positioned above and close to the substrate. The substrate is adapted to move continuously in the downstream direction indicated by arrow 1. The substrate 12 can be a polished metal belt or drum or a polymeric belt. A continuous belt of a polymer such as poly(ethylene terephthalate) is preferred. Substrate 12 provides the surface on which the liquid casting compositions or dopes are cast simultaneously and from which the cast film, after evaporation of the volatile casting solvent, is stripped and wound as roll 21.

The novel die 2 is of a structure that makes possible the casting of films of two or more layers of widely differing thicknesses and from casting compositions or dopes of widely differing viscosities. Despite these differences in thicknesses and viscosities—which are obstacles to conventional cocasting methods—the novel apparatus and method can simultaneously cast two or more layers precisely and with uniform thicknesses.

Films which are made by the apparatus and method of the invention are plural layer polymeric films. They include, for example, magnetic recording films and photographic film supports. These typically comprise a substrate layer such as cellulose triacetate and one or more of certain functional layers. In photographic film supports a functional layer can be, for example, a subbing layer to improve adhesion of light sensitive layers to the substrate. In magnetic recording films, e.g., as disclosed in the patent to Krall, U.S. Pat. No. 3,782,947, the substrate also can be cellulose triacetate and the functional layer can be a dispersion of magnetic particles, e.g., iron oxide particles, in a cellulose ester.

The surface uniformity of photographic substrate films is important for the uniform coating of light sensitive layers. It is also important for magnetic recording films to provide accurate signal recording. The uniform thicknesses of the layers is also important for providing the required physical properties of the films.

The substrate or support for such films is normally cast from a dope comprising a solution of a polymer, e.g., a cellulose ester, in a volatile solvent, e.g., methylene chloride or a mixture of methylene chloride, methanol and cyclohexane. It can, contain optional addenda such as dissolved dyes, dispersed pigments or flow agents.

The functional layer or layers are also cast from dopes; however, their dopes do not necessarily contain the same polymers and the same solvents as the support layer. The dopes can additionally contain, either dispersed or dissolved therein, components that impart the required functionality to the layers. For example, for a magnetic recording layer, the dope can contain iron oxide. Typically, the functional layer dopes are of a lower polymer concentration than the support layer dope and of lower viscosity. The method and apparatus of the invention are suitable for casting any such polymeric solutions and dispersions and any of the casting compositions disclosed in U.S. Pat. Nos. 3,782,947 and 2,932,855, cited above, both of which are incorporated herein by reference.

In the drawings, arrow 1 designates the downstream direction, the direction in which the two-layer film is formed. The die assembly 2 includes three elements: a cover 3, a pie 4 and a body 5. Cover 3, pie 4 and body 5 are coextensive and have a length that is determined by the width of the film being cast. This can be from a few centimeters to one or more meters.

Cover 3, pie 4, and body 5 are held in spaced relationship to one another by a pair of end plates (not shown). Alternatively, the die elements can be held in the spaced relationship by a system of lands and through-bolts as is well known in the art. End plates, though not structural, are used to seal the ends of the die. The space, so defined, includes a dope inlet 6, a distribution cavity 7 and a slot 8 which is formed by the narrowly spaced-apart parallel walls 22 and 23. Similarly, pie 4 and body 5 are spaced apart to include dope inlet 9, distribution cavity 10 and a slot 11 which is formed by the narrowly spaced-apart parallel walls 24 and 25. Inlets 6 and 9 admit dope under pressure. Distribution cavities 7 and 10 act as flow eveners or buffers to assure laminar flow in slots 8 and 11.

The casting substrate 12 can be a polymeric belt or a polished metal belt or drum from which the cast film can be stripped after sufficient solvent is evaporated or it can be a film on which two or more additional layers can be cast. As FIG. 1 shows, the die 2 is so positioned that the slot exits are spaced above and close to the substrate 12. The exact spacing of the die from the casting surface can vary according to the process conditions. A typical spacing or distance of the lowermost lands of the slots from the substrate is in the range from 0.1 to 3 mm, and preferably from 0.5 to 1.5 mm.

The slots 8 and 11 extend from cavities 7 and 10, respectively, to lips which form elongated and mutually parallel slot exits 27 and 28, respectively. The long dimensions of the slot exits are perpendicular to the direction of movement of the substrate 12. The upstream slot exit 27 has an outer lip formed by the planar rectangular land 15 which is coextensive with, i.e., of the same length as, the slot exit. Slot exit 27 has an inner lip formed by the narrow elongated land 14 which is coplanar and coextensive in length with land 15. The plane of land 15 forms an acute angle with the planar upstream wall 24 of slot 11. This contributes to the successful coating of layers that are of uniform but different thicknesses.

The downstream slot 8 has a slot exit 28 which has a first lip formed by land 14, which is coplanar with the inner lip of slot exit 27 since it is the same land. In a die of the invention having more than two slots, the inner lips of, say, the first and third slot exits would not be identical but would still be coplanar.

The downstream slot exit 28 has a second lip formed by the downstream, planar, rectangular land 13. This land is coextensive in length with slot exit 28 and extends in its widthwise or downstream direction to a pinning line 16 which is formed by the intersection of land 13 with the downstream outer surface 29 of the die.

Slot 8 terminates in lands 13 and 14 which are coextensive in length with slot 8 and are parallel to the casting surface 12. Land 13, however, is at a greater distance from casting substrate 12 than is land 14, the additional distance being called the offset.

Dope flowing from slot 8 wets land 13 and separates sharply from the die at pinning line 16. In the preferred apparatus of the invention, the width of the downstream land 13 is less than that of the upstream land 15 and, most preferably, is less than the width of all of the other lands. The short distance from the slot to the pinning line 16 contributes to formation of a thin top or functional layer. The exact width of land 13 and the magnitude of the offset are selected according to the dope viscosity, the dope flow rate and the spacing of the die from casting surface 12. Typical values are illustrated in the Examples hereinafter.

Similarly, pinning line 17 defines the boundary between the dopes flowing from slots 8 and 11. At land 15, because of the dope pressure, a portion of the dope from slot 11 flows upstream to wet the land 15 as far as the pinning line 18 which is formed by the intersection of land 15 with the upstream outer surface 21 of the die. The angle between land 15 and outer surface 21 on the exterior of die assembly 2 is greater than 180 degrees and preferably is greater than 200 degrees. This ensures that the dope from slot 11 does not flow past the pinning line 18. Optionally, a groove can be provided at the pinning line in said outer surface to form an exterior angle greater than said 180 degrees.

In the configuration of the drawings, the dope of support layer 19, which can be highly viscous, is admitted at inlet 9, flow-stabilized in cavity 10 and extruded through slot 11. Similarly, the dope of functional layer 20, which can be much less viscous than the dope of layer 19, is admitted at inlet 6, flow-stabilized in cavity 7 and extruded through slot 8. To maintain adequate flow rates, the viscous support-layer dope flowing through slot 11 is normally under higher pressure than is the functional layer dope flowing through slot 8, and slot 11 preferably is wider than slot 8. It is also a characteristic of the preferred embodiment of the apparatus of the invention that land 13 is wider than its adjacent slot 8 and land 14 is of substantially the same width as its adjacent slot 11.

To withstand the high pressure under which the normally highly viscous dope of support layer 19 is pumped through slot 11 and, accordingly, to maintain lateral uniformity of the cast layers, pie 4 and body 5 have to be strong enough to resist bending and corresponding widening of slot 11 between the end plates of the die. For stainless steel dies that are one meter or more in length, it has been found that the angle between slots 11 and 8 preferably is at least 32 degrees. Similarly, the angle between die body face 21 and slot 11 preferably is at least 32 degrees.

The angle between the plane of slot 8 and the casting surface 12 on the downstream side of said slot is greater than 90° degrees. This contributes to the formation of layers of the desired uniformity.

Although FIG. 2 shows only two slots in the die, the apparatus of the invention can include dies for cocasting more than two layers. For example, additional slots and lands can be provided to cocast a support layer and two functional layers, said functional layers being either on the same side or on opposite sides of the support layer.

As the number of dope extrusion slots increases, it becomes difficult to maintain the 32° criterion, mentioned above, for the additionally required pie members while also maintaining an interior angle of greater than 90° degrees between the plane of the most downstream slot and the downstream direction of the casting surface 12. Normally, there will be only one highly viscous dope being pumped under high pressure, i.e., the dope for the support layer. Accordingly, only the pie-pie members or the pie-body combination defining the high pressure slot need meet the 32° criterion; otherwise, another remedy is to reduce the length of the die to limit pie and body member bending, thereby preserving lateral uniformity of the cast layers.

The invention will be further illustrated by the following comparative example and examples of the invention.

COMPARATIVE EXAMPLE

The apparatus was substantially as in FIG. 2 except that in the dual slot die, the third land (13) was of the same width and was coplanar with the other two lands. Instead of a drum, the casting substrate was a moving plastic casting belt. More specifically, in the dual slot die 2 the slot 8 was 0.127 mm wide (0.005 inches); slot 11 was 0.787 mm (0.031 inches); lands 13, 14 and 15 were 0.762 mm wide (0.030 inches) and were all in the same plane and were spaced above the casting belt by a distance of about 1.52 mm (0.060 inches).

A support layer dope having a viscosity of 100,000 millipascal seconds (mPa.s) was prepared from cellulose triacetate at a 20% solids concentration in a solvent blend of methylene chloride, methyl alcohol and butyl alcohol. A functional layer dope having a viscosity of 125 millipascal seconds (mPa.s) was prepared from cellulose triacetate at a 4% concentration in a solvent blend of methylene chloride and methyl alcohol; the functional layer dope also contained nigrosine dye to provide optical density for uniformity analysis.

The support layer dope was pumped through inlet 9, distribution cavity 10 and slot 11 at a rate that provided a dried support layer thickness of 0.102 mm (0.004 inches). Similarly, the functional layer dope was pumped through inlet 6, cavity 7 and slot 8 at rates that provided dried functional layer thicknesses varying in steps from 1.27 μm to 3.81 μm.

Optical scanning of the cocast film with a microdensitometer revealed an unacceptable "liney" pattern and a coefficient of variation in optical density that exceeded the goal of 5%.

This comparative example demonstrates that when cocasting with a die in which the downstream land 13 was in the same plane as the other lands, and when the casting dopes differed widely in viscosity (100,000 vs. 125 mPa.s) and the cast layer thicknesses differed widely (0.102 mm vs. 1.27-3.81 μm), an unacceptable film was produced.

EXAMPLE 1

In this example of the invention the die structure was as in the Comparative Example, but the width of land 13 was 0.178 mm, land 14 was 0.191 mm and land 15 was 0.762 mm. Land 13, furthermore, was offset above the plane of lands 14 and 15 by 0.254 mm. The casting compositions and procedure were as in the Comparative Example. Microdensitometric analysis of the dried film showed that the functional layer was free of liney pattern and had a coefficient of variation in optical density of a very acceptable 1.5%.

EXAMPLE 2

The die and procedure were substantially as in Example 1, but the functional layer dope had a solids concentration of 1% and a viscosity of 3.1 millipascal seconds (mPa.s). Land 14 had a width of 0.165 mm. The support layer dope was pumped at a rate that provided a dried thickness of 0.051 mm; the functional layer thickness was 0.025 μm. Microdensitometry of the film showed no liney pattern and a highly acceptable coefficient of variation in optical density of 1.3%.

EXAMPLE 3

The die and procedure were substantially as in Example 2, but the functional layer dope had a solids concentration of 15% and a viscosity of 38,000 millipascal seconds (mPa.s). Land 13 was 0.381 mm wide and was offset from the plane of lands 14 and 15 by 1.016 mm. The support layer dope was pumped to provide a dried film thickness of 0.051 mm; the functional layer thickness was 0.0254 mm. Microdensitometric analysis revealed no liney pattern and a very acceptable coefficient of variation in optical density of 1.5%.

Examples 1, 2 and 3 show that although the dope viscosities and the layer thicknesses differed widely as they also did in the unsatisfactory Comparative Example, a film of good quality was obtained with the cocasting die of the invention in which the downstream land 13 was offset above the other lands and was more narrow than the upstream land 15.

The invention has been described in detail with particular reference to preferred embodiments thereof, but it will be understood that variations and modifications can be effected within the spirit and scope of the invention.

I claim:

1. An apparatus for the manufacture of polymeric films having two or more layers which comprises
   a) a casting substrate which is adapted to move continuously in a downstream direction,
   b) a cocasting die for extruding simultaneously two or more liquid casting compositions in contiguous layers onto the moving substrate,
   said die having an upstream side and a downstream side and comprising an assembly of die elements which form an upstream extrusion slot on the upstream side of the die and a downstream extrusion slot on the downstream side of the die,
   said die further comprising a plurality of cavities for receiving casting compositions and for feeding same at a constant rate to respective extrusion slots,
   each of said slots having narrowly spaced-apart parallel walls extending from a cavity to lips which form an elongated slot exit, the slot exits being mutually parallel,
   said die being so positioned that the slot exits are spaced close to the substrate, with the long dimensions of the slot exits being perpendicular to the direction of movement of the substrate,
   the upstream slot exit having an outer lip comprising a first planar rectangular land which is coextensive in length with the slot exit,
   said planar rectangular land forming an acute angle with the planar upstream wall of the slot and extending in the widthwise, upstream direction to a pinning line formed by the intersection of the land with an upstream outer surface of the die at an angle on the exterior of the die greater than 180°,
   said upstream slot exit having an inner lip formed by a second narrow, elongated land which is coplanar and coextensive with the first land,
   on the downstream side of the die, a downstream slot exit having a first lip formed by a land that is coplanar with the first planar land and a second lip formed by a downstream planar, rectangular land, said downstream land being coextensive in length with the downstream slot exit and extending in its widthwise direction to a pinning line formed by the intersection with another surface of the die,
   said downstream land being spaced at a greater distance from the substrate than the other lands.

2. An apparatus according to claim 1 wherein the second land of the upstream slot exit constitutes the first lip of the downstream slot exit.

3. An apparatus according to claim 2 wherein said upstream outer surface of the die intersects said first planar rectangular land at an exterior angle greater than 200°.

4. An apparatus according to claim 3 wherein the width of said downstream land is less than that of the other lands.

5. A cocasting die for extruding simultaneously two or more liquid casting compositions in contiguous layers onto a moving substrate,
   said die having an upstream side and a downstream side and comprising an assembly of die elements which form an upstream extrusion slot on the upstream side of the die and a downstream extrusion slot on the downstream side of the die,
   said die further comprising a plurality of cavities for receiving casting compositions and for feeding same at a constant rate to respective extrusion slot,
   each of said slots having narrowly spaced-apart parallel walls extending from a cavity to lips which form an elongated slot exit, the slot exits being mutually parallel,
   the upstream slot exit having an outer lip comprising a first planar rectangular land which is coextensive in length with the slot,
   said planar rectangular land forming an acute angle with the planar upstream wall of the slot and extending in the widthwise, upstream direction to a pinning line formed by the intersection of the land with an upstream outer surface of the die at an angle on the exterior of the die greater than 180°,
   said upstream slot exit having an inner lip formed by a second narrow, elongated land which is coplanar with the first land,
   on the downstream side of the die, a downstream slot exit having a first lip formed by a land that is coplanar with the first planar land and a second lip formed by a downstream planar, rectangular land, said downstream land being coextensive in length with the downstream slot exit and extending in its widthwise direction to a pinning line formed by the intersection with another surface of the die,
   said downstream land being parallel to but offset from the other lands.

6. An apparatus according to claim 5 having only two slots and wherein the first lip of the downstream slot exit is formed by the second land of the upstream slot.

7. An apparatus according to claim 6 wherein the upstream outer surface of the die intersects said first planar rectangular land at an exterior angle greater than 200°.

8. An apparatus according to claim 7 wherein the width of said downstream land is less than that of the other lands.

9. A method for simultaneously casting liquid polymeric casting compositions comprising a polymer and a volatile liquid as contiguous layers on a moving substrate by means of an extrusion die having a plurality of extrusion slots, to form a polymeric film having layers of uniform but different thicknesses which comprises,
   feeding first and second liquid polymeric casting compositions to a first relatively wide extrusion slot and a second relatively narrow extrusion slot, respectively, in said die, the die being so positioned with respect to the moving substrate that said relatively narrow extrusion slot is downstream from said relatively wide extrusion slot,
   and, before feeding the casting compositions to said slots, flowing said volatile liquid or a dilute mixture thereof with polymer to said slots, thereafter feeding said first casting composition to said relatively wide slot for a period of time sufficient to establish uniform flow and contact with a pinning line along a land upstream from said relatively wide slot and thereafter substituting said second casting composition as the feed for said relatively narrow slot.

10. A method according to claim 9 wherein the casting compositions comprise a cellulosic polymer and a volatile solvent and wherein volatile solvent is fed to the extrusion slots before feeding the casting compositions.

11. A method according to claim 10 wherein a first casting composition is of higher viscosity and is fed at a higher flow rate than a second casting composition.

* * * * *